(12) United States Patent
Conan et al.

(10) Patent No.: US 10,425,454 B2
(45) Date of Patent: Sep. 24, 2019

(54) DEVICE AND METHOD FOR TRANSFERRING THE RENDERING OF MULTIMEDIA CONTENT

(71) Applicant: ORANGE, Paris (FR)

(72) Inventors: Martin Conan, Cesson Sevigne (FR); Elisabeth Lepoil, Chantepie (FR); Jean-Bernard Leduby, Erquy (FR)

(73) Assignee: ORANGE, Paris (FR)

( * ) Notice: Subject to any disclaimer, the term of this patent is extended or adjusted under 35 U.S.C. 154(b) by 176 days.

(21) Appl. No.: 15/300,937

(22) PCT Filed: Mar. 31, 2015

(86) PCT No.: PCT/FR2015/050821
§ 371 (c)(1),
(2) Date: Sep. 30, 2016

(87) PCT Pub. No.: WO2015/150684
PCT Pub. Date: Oct. 8, 2015

(65) Prior Publication Data
US 2017/0019443 A1 Jan. 19, 2017

(30) Foreign Application Priority Data
Mar. 31, 2014 (FR) ...................................... 14 52830

(51) Int. Cl.
*H04L 29/06* (2006.01)
*H04N 21/414* (2011.01)
(Continued)

(52) U.S. Cl.
CPC ....... *H04L 65/60* (2013.01); *H04N 21/41407* (2013.01); *H04N 21/43615* (2013.01);
(Continued)

(58) Field of Classification Search
CPC .......................... H04L 65/60; H04L 65/1089; G06F 17/2247; G06F 17/30038; G06F 17/30058;
(Continued)

(56) References Cited

U.S. PATENT DOCUMENTS 8,762,504 B2 * 6/2014 Khare ................. H04L 63/0492
709/222
9,374,610 B1 * 6/2016 Chang ................ H04N 21/4312
(Continued)

FOREIGN PATENT DOCUMENTS

DE 202013006341 U1 8/2013
WO 2014038342 A1 3/2014

OTHER PUBLICATIONS

Chiappetta, Marco; "How to Transfer any HDTV into a Smart TV", PCWorld, Dec. 6, 2013 (Year: 2013).*
(Continued)

*Primary Examiner* — Ranodhi Serrao
*Assistant Examiner* — James N Fiorillo
(74) *Attorney, Agent, or Firm* — David D. Brush; Westman, Champlin & Koehler, P.A.

(57) ABSTRACT

A transfer method and a method for controlling the transfer of digital content. The content is available on a content server, accessible via a service gateway, and can be processed by at least two devices of a user, namely a first device known as the mobile device and at least one second device known as the rendering device. The rendering device is connected to a transfer device. The content is selected on the mobile device and rendered on the rendering device. The transfer method includes: opening a point-to-point communication channel between the mobile device and the transfer device; receiving an identifier of a service gateway over the point-to-point communication channel; connecting the transfer device to a local network using the gateway iden-
(Continued)

tifier received; receiving an identifier of content to be rendered; accessing the identified content on the content server via the identified gateway.

13 Claims, 4 Drawing Sheets

(51) Int. Cl.
| | |
|---|---|
| *H04N 21/436* | (2011.01) |
| *H04N 21/61* | (2011.01) |
| *H04N 21/643* | (2011.01) |
| *H04N 21/81* | (2011.01) |
| *H04N 21/4363* | (2011.01) |
| *H04N 21/472* | (2011.01) |

(52) U.S. Cl.
CPC ............. *H04N 21/43637* (2013.01); *H04N 21/47217* (2013.01); *H04N 21/6131* (2013.01); *H04N 21/6181* (2013.01); *H04N 21/64322* (2013.01); *H04N 21/8186* (2013.01)

(58) Field of Classification Search
CPC ........... H04N 21/2451; H04N 21/4728; H04N 21/23439; H04N 21/41407
USPC ............. 709/217, 219, 224; 725/28, 31, 93; 715/234
See application file for complete search history.

(56) References Cited

U.S. PATENT DOCUMENTS

| | | | | |
|---|---|---|---|---|
| 2006/0159109 A1* | 7/2006 | Lamkin | ............ | G11B 27/10 370/401 |
| 2006/0161635 A1* | 7/2006 | Lamkin | ............ | G06F 16/4387 709/217 |
| 2010/0095332 A1* | 4/2010 | Gran | ............ | H04N 21/4122 725/93 |
| 2010/0332565 A1* | 12/2010 | Al-Shaykh | ............ | H04N 7/163 707/912 |
| 2011/0088056 A1* | 4/2011 | Ansari | ............ | H04N 7/1675 725/31 |
| 2012/0017235 A1* | 1/2012 | Kudelski | ............ | H04N 21/2541 725/31 |
| 2012/0089699 A1* | 4/2012 | Cholas | ............ | H04L 12/2812 709/217 |
| 2012/0102184 A1* | 4/2012 | Candelore | ............ | H04N 21/4728 709/224 |
| 2012/0210205 A1* | 8/2012 | Sherwood | ............ | H04M 1/72583 715/234 |
| 2012/0331056 A1* | 12/2012 | Kim | ............ | H04N 21/2541 709/204 |
| 2013/0080663 A1* | 3/2013 | Rabii | ............ | G09G 5/006 710/16 |
| 2013/0211567 A1* | 8/2013 | Oganesyan | ............ | H04W 4/20 700/94 |
| 2013/0215825 A1* | 8/2013 | Hsu | ............ | H04W 88/06 370/328 |
| 2013/0218961 A1* | 8/2013 | Ho | ............ | G06Q 30/02 709/204 |
| 2013/0246905 A1* | 9/2013 | Isozaki | ............ | G06F 17/2247 715/234 |
| 2014/0067998 A1* | 3/2014 | Garcia | ............ | H04L 65/4084 709/217 |
| 2014/0068654 A1* | 3/2014 | Marlow | ............ | H04L 65/4084 725/28 |
| 2014/0156543 A1* | 6/2014 | Daniel | ............ | G06F 21/10 705/310 |
| 2014/0195912 A1* | 7/2014 | Odorovic | ............ | G06F 3/0484 715/719 |
| 2014/0256255 A1* | 9/2014 | Thomas | ............ | G06F 9/54 455/41.1 |
| 2014/0380353 A1* | 12/2014 | Barton | ............ | H04L 63/0823 725/31 |
| 2015/0052557 A1 | 2/2015 | Hjelmstedt et al. | | |
| 2015/0189495 A1* | 7/2015 | Chen | ............ | H04W 4/70 455/426.1 |
| 2016/0021414 A1* | 1/2016 | Padi | ............ | H04N 21/4122 725/28 |
| 2016/0037057 A1* | 2/2016 | Westin | ............ | G06F 16/5866 348/207.1 |
| 2016/0173947 A1* | 6/2016 | Cho | ............ | H04N 21/835 725/31 |

OTHER PUBLICATIONS

English translation of the Written Opinion of the International Searching Authority dated May 20, 2015 for corresponding International Application No. PCT/FR2015/050821, filed Mar. 31, 2015.
Written Opinion of the International Searching Authority dated May 20, 2015 for corresponding International Application No. PCT/FR2015/050821, filed Mar. 31, 2015.
International Search Report dated May 20, 2015, for corresponding International Application No. PCT/FR2015/050821, filed Mar. 31, 2015.
Taeshik Shon et al. "Improved RF4CE key agreement approach involving two-phase key distribution for smart-convergence home device" Security and Communication Networks, vol. 5, No. 9., Sep. 25, 2012 (Sep. 25, 2012), pages 974-986, XP055135393.

* cited by examiner

DEVICE AND METHOD FOR TRANSFERRING THE RENDERING OF MULTIMEDIA CONTENT

CROSS-REFERENCE TO RELATED APPLICATIONS

This Application is a Section 371 National Stage Application of International Application No. PCT/FR2015/050821, filed Mar. 31, 2015, the content of which is incorporated herein by reference in its entirety, and published as WO 2015/150684 on Oct. 8, 2015, not in English.

TECHNICAL FIELD

The invention applies to communication between the terminals of a local network, and in particular to communication between a device that has a playback function, referred to as a "playback" device, and a mobile device.

The invention applies most particularly to shifting or transferring certain functions from the mobile device to the playback device by means of a transfer device.

The invention applies in particular to the transfer device that enables the mobile device and the playback device to communicate with each other, which transfer device is in the form of an electronic key or "dongle" connected to the playback device and provided with a communication function, e.g. a wireless function of the WiFi type, in order to connect to the local network.

STATE OF THE ART

With the development of networks and mobile terminals, it is nowadays possible to play back digital multimedia contents (video, audio, etc.) on a user's mobile device, e.g. a smartphone or a digital tablet.

Nevertheless, in certain situations, and in particular when the user of the mobile device is at home, it is more agreeable to play back the multimedia content, e.g. a film, on a television set or on some other terminal of the local network, e.g. a computer, because it has a screen that is larger than that of the mobile device. The term "playback" is used herein to mean making content available to the user: viewing, display, sound playback, etc.

It should be recalled that a local network, also referred to as a home network, is a computer network that connects together terminals (computers, printer peripherals, playback peripherals, storage peripherals, etc.) in a house, which terminals are suitable for communicating with one another, the connection being performed with or without wires. In general, a home network has router equipment, also commonly referred to as a home gateway or a service gateway, which is an intermediate element serving to redirect or "route" data packets between the various terminals and the networks connected thereto. Such a home network often connects with the various terminals by means of WiFi technology. The term "WiFi" (from "Wireless Fidelity") is used herein to cover wireless transmission technologies that enable wireless computer networks to be created based on the standards of the IEEE 802.11 family.

Since the screen of a mobile device is often small in size, and since its loudspeakers are often of mediocre quality, it is not agreeable to use it for playing back content of multimedia type. Furthermore, it is awkward to play such content back on the screen of a mobile device while making use of other functions, e.g. handling telephone calls, text messages, etc.

It is therefore advantageous from several points of view to transfer playback of the multimedia content to another device.

Products have recently become available for this purpose that enable multimedia content to be played back on a personal computer (PC) or on a television (TV) while off-loading from the mobile device the tasks of decoding, displaying, playing back sound, etc., that are inherent to playing back digital content.

In this category, there exist devices suitable for acting in real time to play back digital contents that are made available in stream form, which devices are in the form of an electronic key that can be plugged into a high definition multimedia interface (HDMI) type multimedia port that is used for transferring high definition non-compressed multimedia digital data for a TV. The multimedia content coming from an application, e.g. an application for progressive downloading from the Internet wide area network (WAN), e.g. such as YouTube©, is selected by the user on a first device connected to the local network (smartphone, tablet, computer, etc.) and is played back on the TV via the transfer device. Once the device has been plugged in and powered, it connects itself like any other peripheral of the local network to the service gateway via a WiFi type radio connection using a conventional pairing process, during which it is necessary to input the identifier of the service gateway and its wired equivalent privacy (WEP) security passcode. These identifiers are received during a prior step in which the device activates its WiFi wireless communication module in order to receive said identifier.

Once the device has been attached (or "paired") to a given service gateway in this way, and thus to a given local network, it is no longer easy to change its pairing: in order to change over to some other local network it is necessary once more to perform a pairing stage in order to obtain the identifiers of the new service gateway to which it is desired to make a connection. Furthermore, during this operation, the identifiers of the first gateway are lost, which means that the pairing stage will need to be performed once again later on.

The invention provides a solution that does not present the drawbacks of the state of the art.

THE INVENTION

To this end, in a functional aspect, the invention provides a transfer method for transferring the playback of digital content, said content being available on a content server accessible via at least one service gateway and being suitable for being processed by at least two user devices, a first device referred to as a "mobile" device and at least one second device referred to as a "playback" device, the playback device being connected to a transfer device, said content being selected on the mobile device and being played back on the playback device, the method being characterized in that it comprises the following steps performed in the transfer device:

opening a point-to-point communication channel between the portable device and the transfer device;
receiving over the communication channel an identifier for a service gateway;
connecting the transfer device to a local network by using the received gateway identifier;
receiving an identifier of a digital content to be played back; and
accessing the identified content on the content server via the identified gateway.

Thus, in the invention, a point-to-point connection is set up between the mobile device and the transfer device or "dongle" in such a manner that the mobile device informs the transfer device at least of the identity of a service gateway. This connection, which is set up over a link that may be referred to equally well as a "point-to-point communication channel" or a "point-to-point session", is advantageously set up in point-to-point mode, i.e. only the two specified devices have access thereto, which constitutes a guarantee of security for the data that is exchanged and limits any risk of intrusions from other devices on the communication link, e.g. for the purpose of intercepting data or of modifying data. In particular, it is over this connection as set up in point-to-point mode that the identity of the service gateway (SSID, WEP passcode, etc.) is received for subsequent connection of the transfer device to the local network. In this way, it is certain that the parameters for accessing the network, which are intended for a given transfer device, are not received by just any device, and in particular by some other transfer device, and conversely it is not possible for the communication that has been set up to be interfered with by just any device on the network in order to take control of the transfer device. Advantageously, in the invention, the service gateway may be any gateway, i.e. it may be the user's gateway or some other gateway, e.g. a neighbor's gateway.

It should be observed that the two reception steps may be performed in a different order, e.g. the content identifier may be received before the gateway identifier.

In a particular implementation of the invention, the method is also characterized in that the stage of opening a communication channel between the mobile device and the transfer device is followed by a transmission step for transmitting an identifier of the transfer device over the communication channel.

This implementation makes it possible in particular for the mobile device to select a transfer device from a plurality of possible devices, e.g. devices connected to a plurality of different user peripherals (TV, PC, etc.). In particular, if each of the transfer devices supplies an identity that is specific thereto, then the mobile device can subsequently make a selection, knowing its identity and the characteristics that are associated therewith: the TV to which it is connected, its decoding capabilities, its transmission capabilities, the gateway(s) to which it is attached, etc.

In another particular implementation of the invention, that may be implemented as an alternative or together with the above implementations, a method as described above is also characterized in that the communication channel between the mobile device and the transfer device is set up over a low-power link.

Usually, mobile devices of the invention, typically devices of the smartphone or digital tablet type, include at least one interface that uses low-power wireless radio technology making it possible to exchange messages in compliance with a "low-power" standard over a radio channel. Among those standards, mention may be made by way of example of Bluetooth technology (short-range radio technology for simplifying connections between electronic devices, as developed by the "Bluetooth SIG" association), or indeed the Zigbee protocol or the Z-wave protocol (protocols that likewise enable peripherals to communicate over a radio link at low-power), DECT (another wireless communication standard), etc. In this set of standards, Bluetooth technology is particularly widespread and useful for setting up a connection between a plurality of devices that are close to one another. It is very simple to use, it consumes little power, and it is nevertheless secure. Furthermore, it is independent of the WiFi protocol that is commonly used for the local network connection. In the context of the invention, it is particularly advantageous for such independence to be available: specifically, in this context it is possible to require a device that is already connected to a local network by WiFi (via a first service gateway) to switch over to another local network (via a second service gateway), by giving it the identifiers of the second network over the low-power link. Such a switchover is naturally more difficult to implement when the WiFi connection is used both for setting up the point-to-point communication channel and for connecting with the local network, with the local network connection taking the place of the point-to-point connection.

In another particular implementation of the invention, that may be implemented as an alternative or together with the above implementations, a method as described above also includes a step of storing the identifier of the local network in a memory of the transfer device.

This implementation of the invention makes it possible to reconnect the transfer device automatically to any service gateway, without needing to input its identifiers once again, since they have been stored in the memory of the transfer device. This provides the advantage of making it possible to select one local network from a plurality, if a plurality of local networks are accessible: thus, like most WiFi terminals, the transfer device can store the identifiers of a plurality of networks and can select the appropriate network automatically or on request, e.g. as a function of the service gateway that is accessible in the location where the device is to be found, of the power with which it is transmitting, of the type of operator to which it belongs, etc.

In another particular implementation of the invention, that may be implemented as an alternative or together with the above implementations, the method is also characterized in that an identifier of a content for playing back is received over the point-to-point communication channel.

This implementation of the invention makes it possible to ensure that the identifier of the content is indeed transmitted by the mobile device that opened the point-to-point communication and that transmitted the request for connection to the transfer device for the purpose of playing back contents. This avoids any other terminal of the local network taking untimely control over the transfer device and requesting it to process digital contents. Advantageously, this implementation of the invention also means that the mobile device need not be connected to the local network. For example, the identifier of the content may be transmitted via the Bluetooth point-to-point connection set up between the two devices. Under such circumstances, the mobile device need not necessarily be connected to the local network, since it can continue to exchange information with the transfer device via the Bluetooth connection.

In another particular implementation of the invention, that may be implemented as an alternative or together with the above implementations, the method is also characterized in that the stage of opening a point-to-point communication channel between the mobile device and the transfer device is followed by a pairing sub-step during which the user puts the transfer device into a pairing state.

In this implementation, and advantageously, there is no need to input a password in order to connect to the local network. For example, and in well-known manner, the WiFi protected setup (WPS) protocol makes it possible for two devices that are in this mode and that are close to each other to set up communication. There is therefore no need to transmit the password (WEP passcode) over the point-to-point communication channel.

In another functional aspect, the invention provides a control method for controlling the transfer of a digital content, said content being available on a content server accessible via at least one service gateway and being suitable for being processed by at least two user devices, a first device referred to as a "mobile" device and at least one second device referred to as a "playback" device, the playback device being connected to a transfer device, said content being selected on the mobile device and being played back on the playback device, the method being characterized in that it comprises the following steps performed in the mobile device:

opening a point-to-point communication channel between the mobile device and the transfer device;

sending over the communication channel an identifier of a service gateway; and sending an identifier of a content to be played back.

This method presents advantages analogous to those described above for the transfer method: the control method, which is typically performed on the user's mobile device, serves to control the point-to-point communication channel in order to guarantee that data is exchanged in reliable manner, and it then manages the sending of an identifier for the content that is to be transferred by the transfer device.

In a particular implementation, the transfer control method is also characterized in that the received gateway identifiers are the identifiers of the mobile device.

In this implementation, and advantageously, it is the mobile device that acts as a gateway in router mode (commonly referred to as "tethering"), which means there is no need for a service gateway, with the device (mobile telephone) serving on its own to dialogue with the transfer device, both for selecting and transmitting the identifiers of the content that is to be played back, and also for connecting to the wide area telecommunication network in which the content server is to be found.

In another particular implementation, that may be implemented as an alternative or together with the above implementation, the control method is also characterized in that it includes a connection step for connecting the mobile device to a local network by using the received gateway identifier.

Advantageously, in this implementation, the local network that is used by the transfer device for connecting to the content server may be the network to which the mobile device also belongs. The two devices (the mobile device and the transfer device) can thus communicate in the context of the local network controlled by the same service gateway, conventionally making use of local network protocols, such as universal plug and play (UPnP).

In another particular implementation, that may be implemented as an alternative or together with the above implementations, the method of controlling the transfer of digital content is also characterized in that it includes:

a reception step for receiving over the point-to-point communication channel an identifier of the transfer device; and a selection step for selecting one transfer device from a plurality as a function of a received identifier.

This implementation of the invention makes it possible to select between a plurality of transfer devices present in the local network. Thus, if a plurality of user devices are provided with respective transfer devices, the user can select to transfer the video content selected on the mobile terminal to a particular playback device, and thus to a particular display device (a PC, a digital tablet, a TV, etc.).

In a hardware aspect, the invention also provides a transfer device for transferring digital content that is available on a content server accessible via at least one service gateway and that is suitable for being processed by at least two user devices, a first device referred to as a "mobile" device and at least one second device referred to as a "playback" device, the playback device being connected to a transfer device, said content being selected on the mobile device and being played back on the playback device, the device being characterized in that it comprises:

an opening module for opening a point-to-point communication channel between the mobile device and the transfer device;

a reception module COMD) for receiving over the communication channel an identifier of a service gateway;

a connection module for connecting the transfer device to a local network by using the received identifier of a gateway;

a reception module for receiving an identifier of a content for playing back; and an access module for accessing the identified content on the content server via the identified gateway.

In another hardware aspect, the invention also provides a transfer control device for transferring digital content that is available on a content server accessible via at least one service gateway and that is suitable for being processed by at least two user devices, a first device referred to as a "mobile" device and at least one second device referred to as a "playback" device, the playback device being connected to a transfer device, said content being selected on the mobile device and being played back on the playback device, the device being characterized in that it comprises:

an opening module for opening a point-to-point communication channel between the mobile device and the transfer device;

a send module for sending over the communication channel an identifier of a service gateway; and a send module for sending an identification of a content to be played back.

The term "module" may correspond equally well to a software component or to a hardware component or to a combination of hardware and software components, a software component itself corresponding to one or more computer programs or subprograms, or more generally to any program element suitable for performing a function or a set of functions as described for the modules in question. In the same manner, a hardware component corresponds to any element of a hardware assembly suitable for performing a function or a set of functions for the module in question (integrated circuit, IC card, memory card, etc.).

In another hardware aspect, the invention also provides a terminal including a transfer control device as described above.

In another hardware aspect, the invention also provides a terminal including a transfer control device as described above and a service gateway emulation module enabling it to access the content server.

In another hardware aspect, the invention also provides an electronic key including a transfer device as described above.

In another hardware aspect, the invention also provides a system comprising a terminal as claimed above, a digital gateway, a transfer device, and a playback device as claimed above.

In another hardware aspect, the invention also provides a computer program suitable for being used to perform the above defined method of transferring the playback of a content, the program including code instructions that perform the steps of the transfer method when the program is executed by a processor.

In another hardware aspect, the invention also provides a computer program suitable for being used to perform the above defined method of controlling the transfer of a content, the program including code instructions that perform the steps of the transfer control method when the program is executed by a processor.

In yet another hardware aspect, the invention provides a processor-readable data storage medium storing a program including program code instructions for executing steps of any of the above defined methods.

These devices, these computer programs, and these storage media present characteristics and advantages analogous to those described above with reference to the method of transferring a digital content and the method of controlling the transfer of a digital content.

The invention can be better understood on reading the following description, which is given by way of example and made with reference to the accompanying drawings.

DETAILED DESCRIPTION OF AN IMPLEMENTATION ILLUSTRATING THE INVENTION

FIG. 1 shows a mobile device and a transfer device in a prior art local network. The local network (10) comprises a mobile device (4), a user's playback device (7) connected to a prior art transfer device (5), and a service gateway (6).

Figure 1:
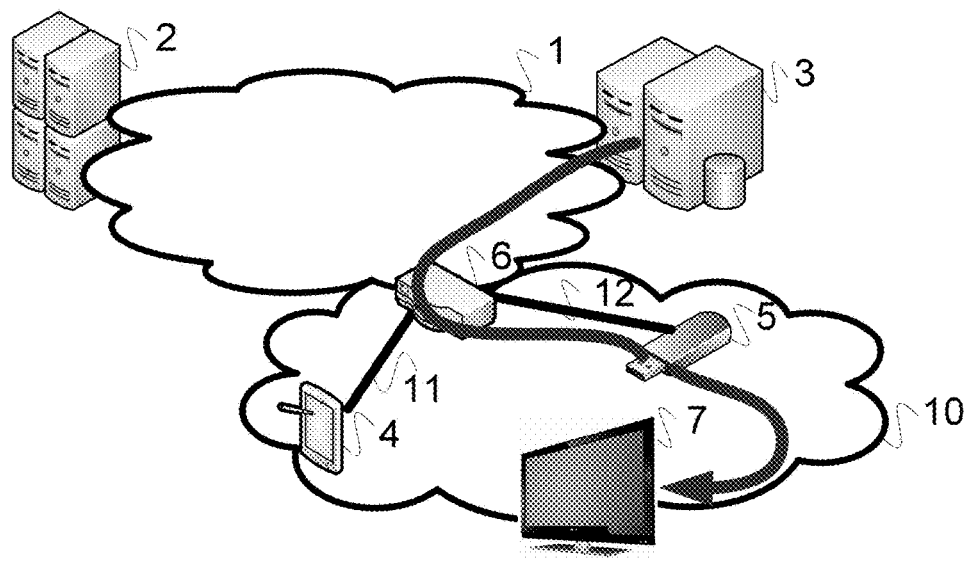
FIG. 1 shows a mobile device and a transfer device in a prior art local network.

The terminal devices 4 and 5 are suitable for setting up connections with the service gateway (6) that is also connected by means of a broadband connection to the Internet (1), which constitutes a wide area network (WAN), in contrast to a local area network (LAN). By way of example, the network (10) is an Internet protocol (IP) local network where the term "Internet protocol" designates the basic protocols of Internet type, and by extension constitutes a name for the network itself, and the broadband connection is of the asymmetric digital subscriber line (ADSL) type. The WAN (1) in this example is likewise of IP type and contains a multimedia content server (3) that serves in particular to host contents for making available to terminals of the local network (10), and a server (2) of a service and/or network operator, which server contains in particular applications of the operator and suitable for being made available to devices of the local network.

The service gateway (6) includes a WiFi communication function known as an access point (AP) that enables it to communicate wirelessly with the terminals of the network. This access point includes a bidirectional radio module for transmitting and receiving signals in the local network.

Consequently, the term "terminal device" or more simply "terminal" is used to mean any device suitable for connecting to the gateway (6), such as a computer or a TV, a PC, a smartphone, a personal digital assistant (PDA), or more generally any device suitable for communicating with the service gateway, with or without wires. Amongst such terminals, a playback device (7) may be constituted by way of example by a TV. Another playback device could be a user's computer, not shown. By way of example, a mobile device (4) may be a smartphone or a digital tablet, or indeed a laptop computer, which may optionally be connected to a mobile network (not shown).

A so-called "compatible" application, supplied by a network and/or services operator (2), running on the mobile device (4), and constituted in this context by a TV application for so-called "live" content, i.e. of "television channel" type, or for on-demand content, enables the user to select multimedia content that is to be played back on the TV (7) associated with the transfer peripheral (5), which in this example, is connected to an HDMI digital port of the TV (7) and is in the form of an electronic key or "dongle". As a result of selecting a specific function on the mobile device (a button selected by pressing), the multimedia content is directed to the HDMI key, and can then be played on the TV. The electronic key can then connect itself to the content server (3) of the WAN (1) from which it recovers the content directly, possibly with quality or resolution that is better than the initial quality or resolution of the mobile device (4), and without passing via the mobile device. In FIG. 1, the curved arrow shows the path taken by the content from the content server (3) to the TV, passing via the service gateway (6) and then the transfer device (5). The content is recovered with continuous downloading or "streaming" from the content server.

This transfer of content presents several advantages:
the mobile terminal can be off-loaded from a task that consumes a large amount of resources (decoding, displaying video, etc.), thereby enabling it to provide the user with other functions at the same time (e.g. viewing mail, processing text messages, etc.);
the quality and/or the resolution of the multimedia content can be greater on the TV than on the mobile device, thereby improving user comfort; and
the mobile may be used as a remote control for basic functions associated with the content, such as for example stopping playback ("pause"), restarting ("play"), controlling volume (silence "mute", increasing volume "vol+", decreasing volume "vol−"), etc.

Figure 2:
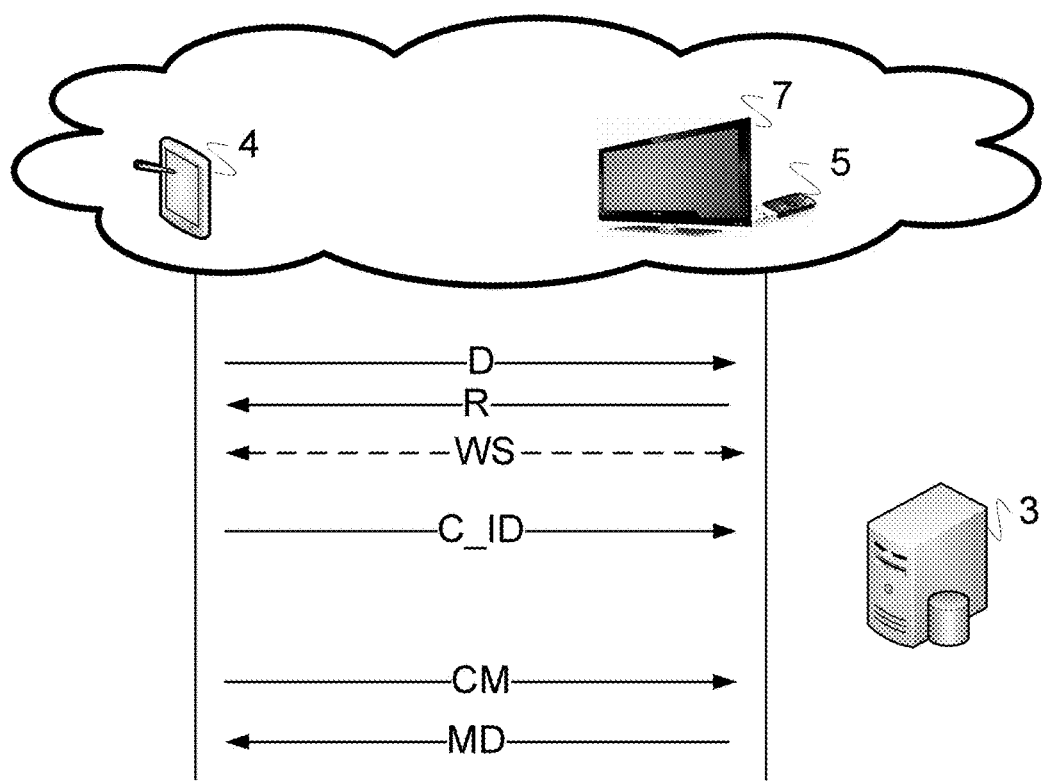
FIG. 2 shows a simplified timing chart of exchanges between a prior art transfer device and a mobile device.

Conventionally, putting that prior art into operation requires several steps, as set out in detail below with reference to FIG. 2.

It is assumed that the electronic key has all of the low level software (firmware) and high level software (programs) that it needs for its operation and that it has been connected to the HDMI port of the TV with the compatible application correctly loaded and launched on the mobile device; for example this may involve a catalog of audio visual contents, or a web application proposing such contents (YouTube™, etc.).

It is also assumed that during a prior step (not shown), both the mobile device and the transfer device are connected to the local network, i.e. to the service gateway (6) of the local network. The connections to the service gateway are symbolized by links 11 and 12.

This connection is conventionally set up in a so-called "infrastructure" mode as contrasted to the above-mentioned "direct" mode. The mobile terminal (4) conventionally connects to the service gateway (6) of the local network (10) via a wired or wireless connection. In the prior art, in order to access the gateway (6) on a first occasion from a terminal (e.g. 4), a user inputs the identification parameters of the WiFi network into the terminal. In particular, the user inputs or selects the name of the home network, known to the person skilled in the art as the service set identifier (SSID, or indeed ESSID or BSSID), which is often in the form of an alphanumeric string (e.g.: "Livebox 666"), together optionally with a password in the form of a code giving access to the home network, such as a wired equivalent privacy (WEP) or a WiFi protected access (WPA) passcode of function and structure that are well known to the person skilled in the art. Once the device has been associated in this way, it can connect directly to the service gateway, in particular by broadcasting a request that contains the identifier (SSID, BSSID, ESSID, etc.) with which it has already been configured.

If the electronic key does not yet know the local network, i.e. if this is its first connection, it puts itself into WiFi mode (by default into router WiFi mode also known as hotspot mode). By using the WiFi connection, the mobile device takes control over the electronic key and provides it with the identifiers of the local network.

It should be observed that this solution firstly requires the mobile terminal to connect to the service device, and secondly it requires the transfer device to be configured by initialization in "hotspot" mode. This initializing "setup" stage serves to provide the mobile terminal with the identifiers of a new gateway.

Once both pieces of equipment are connected to the network via the service gateway, communication is set up between them. For this purpose, the mobile device begins by discovering (D) the presence on the network of one or more peripherals of this type. This discovery step corresponds to an operation that is well known to the person skilled in the art, and that can be performed in the form of a request complying with a local network protocol, e.g. the universal plug and play (UPnP) standard. It should be recalled that the purpose of the UPnP standard is to enable terminals to connect easily to a local network and to communicate simply therein. It constitutes a set of communication protocols based on the IP protocol and put forward by the UPnP Forum. In order to control the terminals of the network, UPnP makes use of control points (CP). Conventionally, a control point transmits discovery messages (MSEARCH) to the various terminals of the network in order to recover in return descriptions of the terminals corresponding to the request. These discovery messages are usually transmitted in point-to-multipoint communication mode, also known as multicast mode, from the control point to the terminals. A piece of terminal equipment that is compatible with the UPnP standard responds to these request messages and also transmits presence messages (ALIVE) at a regular rate to indicate it is active and connected to the network. The control point (CP) of the local network, situated in this example in the smartphone (4), transmits search messages (SEARCH) in multicast mode searching for pieces of equipment of a given type, specifically in this example electronic transfer keys.

The key (5) responds (R) to the discovery request (D).

The mobile device (4) possibly selects one key (and thus a TV or associated PC) from among those it has discovered.

A communication channel or "websocket" (WS) is set up between the mobile device and the electronic key in order to exchange commands and/or data. The websocket protocol serves to provide bidirectional communication between a client and a server over a network using the hyper text transport protocol (HTTP), which is a client-server communication protocol developed for Internet networks and in particular for the web. By extension, websocket is a standard covering both a network protocol and a programming interface suitable for use by an application on any client and web server. The protocol was standardized by the Internet Engineering Task Force (IETF) organization in its specification request for comments (RFC) 6455, and the corresponding program interface has been standard by the W3C organization (under the reference: The web sockets API; W3C candidate recommendation 20 Sep. 2012).

Consequently, when the user selects a content (C) and presses on the redirection button on the screen of the mobile device, the application of the mobile device requests the electronic key to launch the transfer application for playing back the content C identified by its identifier (C_ID); the identifier is transformed into a universal resource locator (URL) (e.g., http://www.myserver.com/C_ID). Thereafter the electronic key accesses a content server (3) in order to recover the digital content in streaming by using the URL. By definition, "streaming" corresponds to continuous downloading of multimedia contents. The client terminal (in this example the electronic key) makes a request by beginning by downloading a document that describes the parameters giving access to the service via the HTTP protocol, and then it accesses the content on the content server (3), and transmits it to the playback device (7), with the service then actually starting, i.e. the playback device (7) can receive and display the content C.

While downloading the content, commands (CM) may be sent to the electronic key (pause, play, fast forward, etc.) and status messages (MD) may be received from the electronic key (metadata, state of the player, etc.).

In the light of the above description, it can clearly be seen that that prior art architecture and the way it is used present certain limitations:

the mobile device does not control the communication channel that is set up between the two devices: since the channel is not of the point-to-point type, but rather of the multipoint type, any device of the network can interfere with the communication;

furthermore, the mobile device does not control which local network is selected, and that is a situation that can be troublesome when a plurality of local networks are present and accessible at the same time (e.g. the user's network and a neighbor's network); and once the electronic key is associated with a given gateway, and thus with a given local network, it can no longer change networks easily: in order to switch over to another local network it is necessary once more to perform a set-up stage, and it is therefore necessary to cause the electronic key to leave its current association in order to transmit other identifiers thereto, which operation causes the identifiers of the first gateway to be lost.

Figure 3:
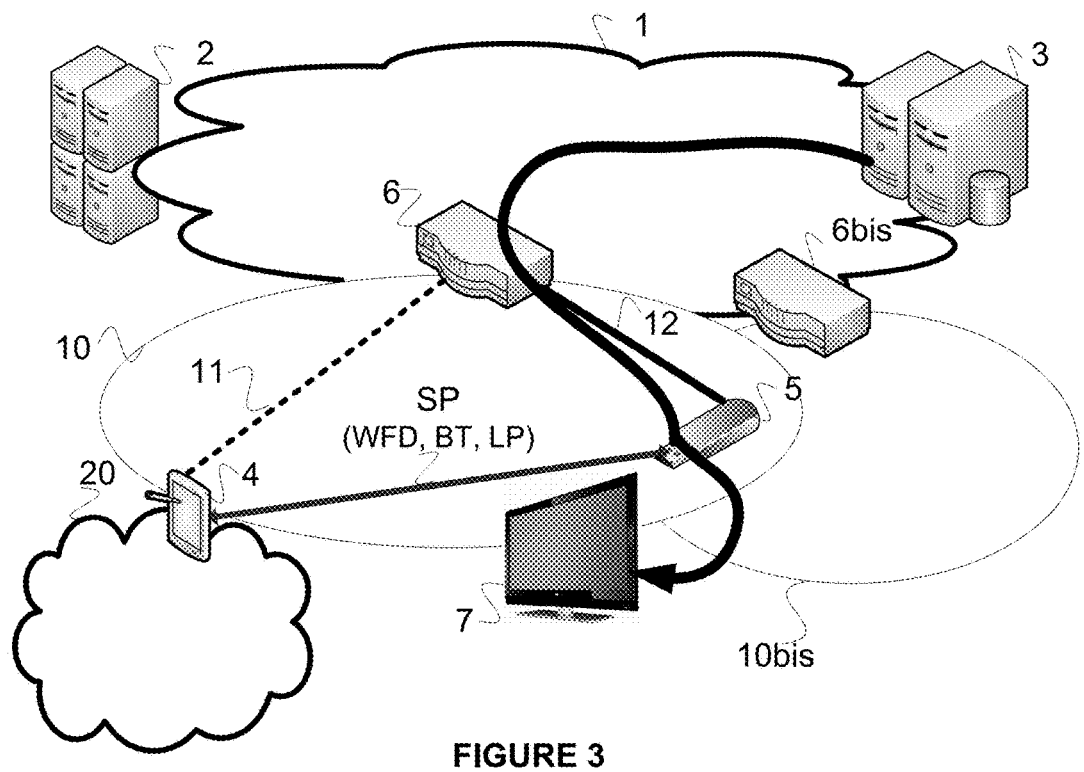
FIG. 3 shows a mobile device and a transfer device in a first embodiment of the invention.

FIG. 3 shows the context of a first implementation of the invention that enables those limitations to be avoided.

As described above with reference to FIG. 1, a local network (10) controlled by a service gateway (6) includes a mobile device (4) and a transfer device (5) of the invention. In this example, the service gateway (6) is a home gateway that routes data in the local network (10) and between the local network (10) and the WAN (1) in which the server (2) of the network and/or services operator and the content server (3) are to be found. The home gateway (6) may for example be a router known under the trademark Livebox©.

The home local network context is given by way of example and can easily be transposed to the context of a business network.

In this example, the mobile device (4) is also connectable to a mobile network (20). The mobile network is a cellular mobile radio network, e.g. of the third generation (3G), in compliance with the universal mobile telecommunications system (UMTS) standard or indeed of the fourth generation (4G), e.g. in compliance with the long term evolution (LTE) standard, etc.

As described above with reference to FIG. 1, a user of the local network possesses at least two devices, namely a mobile device (4) and a playback device (7), a TV in this example. The user seeks to display on the screen of the playback device (7) content that has previously been selected on the mobile device: by using an application on the mobile device, in this example a TV application previously supplied by the network and/or services operator (2), the user selects a multimedia content (audio, video, etc.) that is available on a content server (3) for rendering on the TV (7) associated with the transfer peripheral (5), which in this example is connected to the HDMI video port of the user's TV (7) and is in the form of an electronic key or "dongle".

In this example, the contents are "live" contents, i.e. they are for delivering in real time to the operator's client, or users of the local network. By way of example, they may be digital television channels; The content server (3) in this example is in the WAN (1), however in another example it could be situated in a business local network, e.g. in the service gateway (6) or in any other piece of equipment capable of hosting such a content server.

Unlike the prior art solution described above with reference to FIG. 1, a first stage of associating the mobile device with the transfer device is set up between those two pieces of equipment in a manner that is private and secure: the initial communication, referred to below as a "point-to-point session" and represented by double-headed arrow (SP), takes place using a bidirectional point-to-point communication mode.

In a first implementation, it may constitute communication in a so-called "ad hoc" mode between two pieces of equipment that have a WiFi function. In "ad hoc" mode, also known as "WiFi direct" (WFD), and in contrast to the "infrastructure" mode described above with reference to FIG. 1, the wireless devices connect to each other so as to set up point-to-point connections (also known as "peer-to-peer" connections), i.e. a network in which each device acts both as a client and as a server or access point. The WiFi direct mode, also known as WiFi P2P (for peer-to-peer), is technology that has been developed by the "WiFi alliance" consortium to enable data to be shared between various peripherals (computers, TVs, cell phones, etc.) using their WiFi connections and without accessing an intermediate WiFi access point (router, gateway, etc.). By default, in this implementation, the transfer device is configured (by its own firmware) to put itself into a so-called "hotspot" WiFi mode (i.e. a mode in which it acts as a WiFi access point) if it does not manage to make a connection in infrastructure mode to an existing network. The mobile device, which also has a WiFi module detects the presence of the transfer device and puts itself into "WiFi direct" mode, i.e. it requires the transfer device to perform WiFi communication in this direct mode. This implementation procures the advantage of enabling the exchange of data, and in particular the identifiers of the local network, over a channel, that is secure. In general manner, WiFi technology is well known to the person skilled in the art for its capabilities of providing good security over the channel, providing it is carefully configured. It possesses long range (greater than ten meters and theoretically possibly reaching several hundred meters), and as a result it enables the two connected peripherals to be quite a long way apart. It is robust, reliable, and fast. This type of session thus enables information such as the identities of the local network and of the transfer peripheral to be exchanged in reliable manner between the two peripherals.

In a second implementation, the communication may be of the Bluetooth (BT) type.

Alternatively, the channel may be set up using any means available to any person skilled in the art; by way of example, mention may be made of the Zigbee protocol (a protocol that enables communication within local networks over a radio link and with low power consumption, the digital enhanced cordless telecommunications ultra-low energy (DECT ULE) standard, which is an extension of the DECT standard for low-energy applications), or indeed the Bluetooth low energy (BLE) standard that sets out to provide low power compared with standard Bluetooth applications, etc. Networks that implement these various standards consume little energy. They are sometimes referred to under the generic term low power wireless personal area networks (LoWPAN). Specifically, the IETF 6LoWPAN work group has recently defined mechanisms for encapsulating and compressing headers to enable data packets in the IPv6 format (IP protocol, version 6) to be sent and received via a wireless communication protocol over a LoWPAN network. In preferred manner, the SP link is a LowPan (LP) link.

During this initial session in point-to-point mode (SP), the mobile device transmits to the terminal device the identifier (SSID, BSSID, ESSID) of the access point of the service gateway (6), possibly together with a password or an identification passcode (the WEP passcode), etc. Since this session between these devices is private, given that it is set up in point-to-point mode, it presents several advantages over the above-described prior art:

transmitting the identifiers of the local network over this private session enables them to be taken into account automatically by the transfer device (5) without it needing to make a connection beforehand in hotspot mode, as in the prior art, in order to recover the identifiers of the service gateway;

it is possible to transmit a plurality of different local network identifiers to the transfer device. Consequently, the transfer device can select one network from a plurality, e.g. depending on the location where it is to be found, or depending on an order received from the mobile device, or depending on an action by the transfer device itself (actuator, interface, etc.); in the example of FIG. 3, there can be seen a second service gateway (6bis), which may for example be the user's gateway, or the gateway of one of the user's neighbors. The transfer device can access either gateway. Thus, depending on requirements, the user can make use of the service gateway 6 or the service gateway 6bis in order to access content on the WAN. This possibility is also advantageous if the content server is to be found in the local network (10bis) controlled by the gateway (6bis); there is no need for the mobile device to reconnect to the local network subsequently, unlike that which occurs in the prior art as explained above with reference to FIG. 1: it can transmit the identifier of the content for playing back during the point-to-point session and subsequently the transfer device can itself search for the content on the WAN. That is why the link (11) between the mobile device and the service gateway is drawn as a dashed line in FIG. 3, given that it is optional.

This prior stage of communication in point-to-point session mode, which is characteristic of the invention, is followed by the transfer device disconnecting from the session and then reconnecting to the local network in infrastructure mode, which connection is represented by the link (12) to the service gateway. Disconnection is essential when a prior WiFi connection is used, since the transfer device cannot simultaneously be in WiFi ad hoc point-to-point mode with the mobile telephone and in WiFi infrastructure mode with the service gateway. It must therefore disconnect beforehand. Disconnection is optional with Bluetooth since there is nothing to prevent the transfer device being connected simultaneously by Bluetooth to the mobile device and by WiFi to the gateway. Furthermore, the disconnection of two Bluetooth devices is generally implicit (if the two devices move apart outside the maximum range permitted by the standard).

It can thus be seen that Bluetooth technology, in addition to being very simple to use, secure, and consuming very little energy, possesses an advantage over WiFi concerning the management of local networks: if the transfer device is already attached to a network via a WiFi connection in infrastructure mode, it no longer has any need to put itself into WiFi direct mode, which would prevent it from receiving new identifiers. Thus, when the user has connected the transfer device to a first network that remains available (e.g. the user is connected via a neighbor whose local network (10bis) remains accessible from the user's own home), the transfer device remains attached thereto even when the user no longer desires to access it. Under such circumstances, it is therefore necessary explicitly to dissociate the transfer device from the neighbor's gateway (6bis) and force it to go back into WiFi direct mode in order to receive the new identifiers via a point-to-point session. In contrast, if the communication link is of the Bluetooth type, a new identifier can be transmitted over the Bluetooth link so as to force the transfer device to change to the service gateway.

In order to dialog over the session as set up in this way between the mobile device and the transfer device, an HTTP type application protocol may be used in conventional manner in association with the above-described websocket (WS) protocol that serves to provide bidirectional communication between the client and the HTTP server, specifically the transfer device and the mobile device.

Once the transfer device (5) is connected to the local network, a content can be selected and transferred to the TV (7). An application running on the mobile device (4) enables the user to select a multimedia content (e.g. a TV channel), and then after selecting a mobile function (activating a key, button, touch area, voice command, etc.), the multimedia content is redirected to the transfer device, which possibly transforms the identifier of the content into an address that is valid for the content server (3) of the WAN (1) that it accesses in order to recover the content (CH1) directly, preferably with quality or resolution that is better than the initial quality or resolution of the mobile device, and without passing via the mobile device. The content may be recovered in streaming from the server (3) of the WAN and it may be played back on the screen of the TV; the curved arrow in FIG. 3 represents the path followed by the digital content.

This implementation is described in greater detail with reference to FIG. 6.

Figure 4:
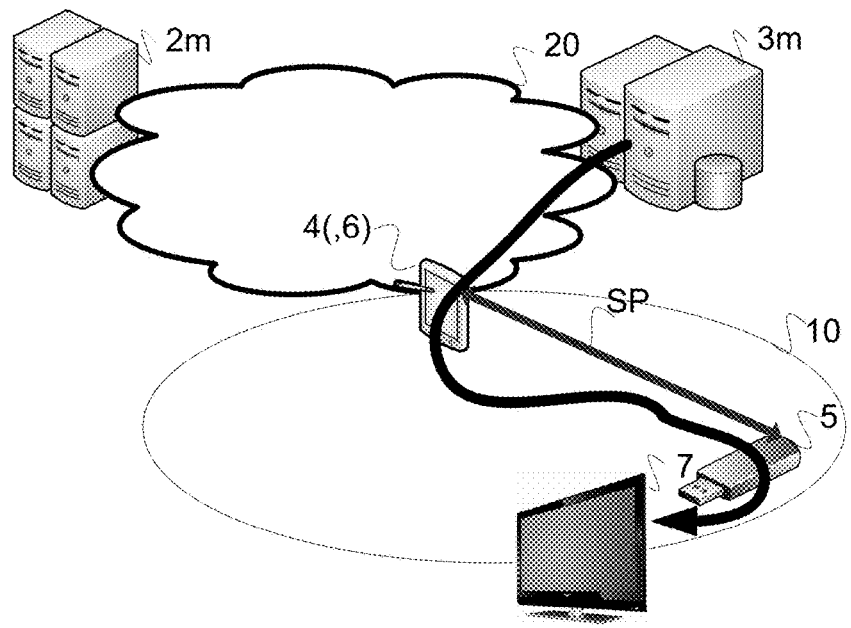
FIG. 4 shows a mobile device and a transfer device in a second embodiment of the invention.

FIG. 4 shows a local network comprising a mobile device (4) and a transfer device (5) connected to a playback device (TV, 7) in another embodiment of the invention. As described above, the user selects multimedia content audio, video, etc.) that is available on the content server (3m) for rendering on the TV (7) associated with the transfer peripheral (5) connected to the HDMI video port of the user's TV (7) and in the form of an electronic key or "dongle". The local network (10m) is no longer controlled by a conventional service gateway, but by the mobile device (4) that acts as the service gateway, i.e. it is the mobile device (4) that gives the other devices of the local network access to the Internet, by acting as a router in a so-called "tethering" mode. A tethering device, in this example the mobile device (4), is a terminal that gives another terminal access to the Internet outside the local network by means of a wired connection (e.g. USB or Ethernet) or a wireless connection (e.g. Bluetooth or WiFi).

Apart from equipment being shared in this embodiment, since the home gateway and the mobile device are the same item, the steps of setting up a session or a communication channel in point-to-point mode, of connecting the transfer device to a home gateway by using identifiers that are communicated thereto during said point-to-point session, and then of accessing the content on a content server (3m) via the service gateway, which coincides with the mobile device (4), are identical to those described with reference to FIG. 3.

The servers (2m) of the network operator and/or of the services operator, which are now to be found in the mobile Internet network, may optionally be the same as the servers of the above-described WAN Internet network (1). The same applies to the content server (3m) which may optionally coincide with the above-described content server (3).

As mentioned above with reference to FIG. 3, and as represented by the double-headed arrow (SP), a first stage of associating the mobile device with the transfer device (5) is set up between the two devices: this initial communication takes place in a point-to-point communication mode between the two pieces of equipment, e.g. in WiFi direct mode (ad hoc, WFD, or using Bluetooth (BT). Then, once a session has been set up between the two devices, the transfer device (5) can access the content in streaming from the mobile content server (3m) via the mobile device (4) in tethering mode. The content that is recovered in streaming can then be decoded, prepared, and forwarded to the playback device (TV), as before.

Figure 5:
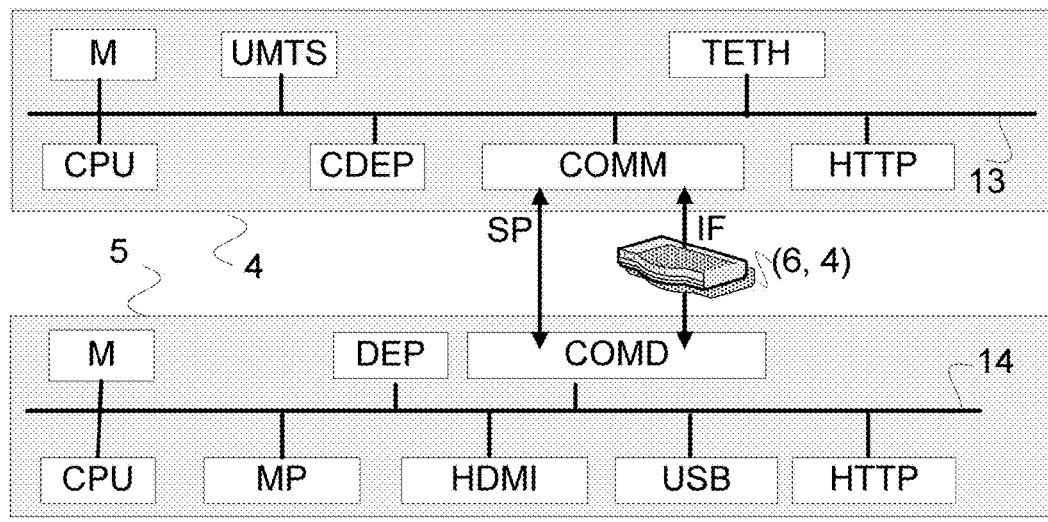
FIG. 5 shows the hardware architecture of a transfer device connected to a mobile device in an embodiment of the invention.

FIG. 5 shows the hardware architecture of a transfer device (5) of the invention connected to a mobile device (4) of the local network.

In conventional manner, the mobile device (4) has memories (M) arranged around a central procedure unit (CPU). The memories may be of the read only memory (ROM) type or of the random access memory (RAM) type, and they may be removable or hardwired into place, etc. It communicates with the local network (1) via the communication module (COMM) that enables it to connect with wires (via an Ethernet cable) or wirelessly (via a radio channel of WiFi, Bluetooth, Zigbee, etc. type) to the service gateway or to another local network device. As described above with reference to FIG. 2, an ad hoc point-to-point communication channel (SP) is used for an initial stage of setting up the session between the two devices (4 and 5). The channel may be of the WiFi, direct, Bluetooth, etc. type. Thereafter, in an implementation of the invention, the two devices dialog in infrastructure mode (IF) via the service gateway (6). In another implementation of the invention, it is the mobile device that acts as a gateway in tethering mode and the two devices dialog in infrastructure mode without the service gateway.

For this purpose, the mobile device (4) has an access point or tethering (TETH) mode that enables it to transform itself into a gateway in order to communicate with the WAN (1) that may then be the same as the mobile IP network (20). The mobile device also has a mobile radio module (e.g. a UMTS module) that enables it to dialog with the mobile network (20). Finally, it includes an application (CDEP) for controlling transfer, in particular for communication with the transfer device (5). The module CDEP, which may comprise software and/or hardware, is capable in particular of performing the actions described above with reference to FIGS. 3 and 4, and both described below with reference to FIG. 6: it can select a transfer device (from a plurality of devices), it can request the setting up of a point-to-point communications channel with that device for transmitting identifiers of the local network, it can recover and store the identification of the transfer device, it can select a content, and it can transmit an identifier for that content to the transfer device, it can control playback of the content, etc.

A portion of the memory MEM is connected to the WiFi access point and among other things it stores the identification parameters of the home gateways that the mobile device can access, the parameters for identifying and associating pieces of home equipment with the access point when the mobile device is operating in router (or tethering) mode (table of identifiers comprising the unique identifiers of the home terminals that have already been authorized to access the home network via the access point, routing elements, etc.), the identification parameters of transfer devices of the local network (names, characteristics, etc.).

It also includes an HTTP type communication module for providing HTTP type communications, e.g. of the websocket type (WS); it should be observed that communication of WS type can be undertaken over a Bluetooth link.

In conventional manner, all of the modules communicate with one another via a data bus (13).

The transfer device (5) also has memories (M) arranged around a processor (CPU). The memories may be of (ROM), (RAM), or other type. A portion of the memory (M) stores, amongst other things, the identification parameters of the home gateways that can be accessed by the transfer device and the identity of the transfer device (e.g.: dongle_number_36 or key#2). It communicates with the local network (1) and the mobile device (4) via the communication module (COMD) that enables it in particular to make a wireless connection (WiFi) with the service gateway (6) in infrastructure mode (via the IF connection) or directly to the mobile device (connection SP) in WiFi direct mode or Bluetooth mode. In this example, it is powered via a USB type serial interface. It also comprises:

- an application (DEP) for communicating with the mobile device (4) and for transferring content. This module is capable in particular of setting up communication, preferably private communication, with the mobile device via the communication module COMD, of accepting a request to search for a streaming source for content identified by its identifier on the network instead of the mobile device, of receiving commands for controlling playback by the mobile device acting as a remote control, of sending it identification, state, etc. information;
- a media player (MP) capable of playing back (receiving, decoding, preparing) the streams received in streaming mode and of delivering them to the playback device (TV); a media player includes amongst other things a set of (audio, video, etc.) decoders suitable for decoding multimedia contents, together with an interface for communication with the mobile device and suitable for interpreting orders coming therefrom (pause, rewind, volume control, etc.);
- an interface module with the playback device (HDMI) capable of physically and logically interfacing with the TV in order to transmit the decoded multimedia content thereto (audio and video);
- an HTTP type communication module.

All of the modules communicate with one another in conventional manner via a data bus (14).

Figure 6:
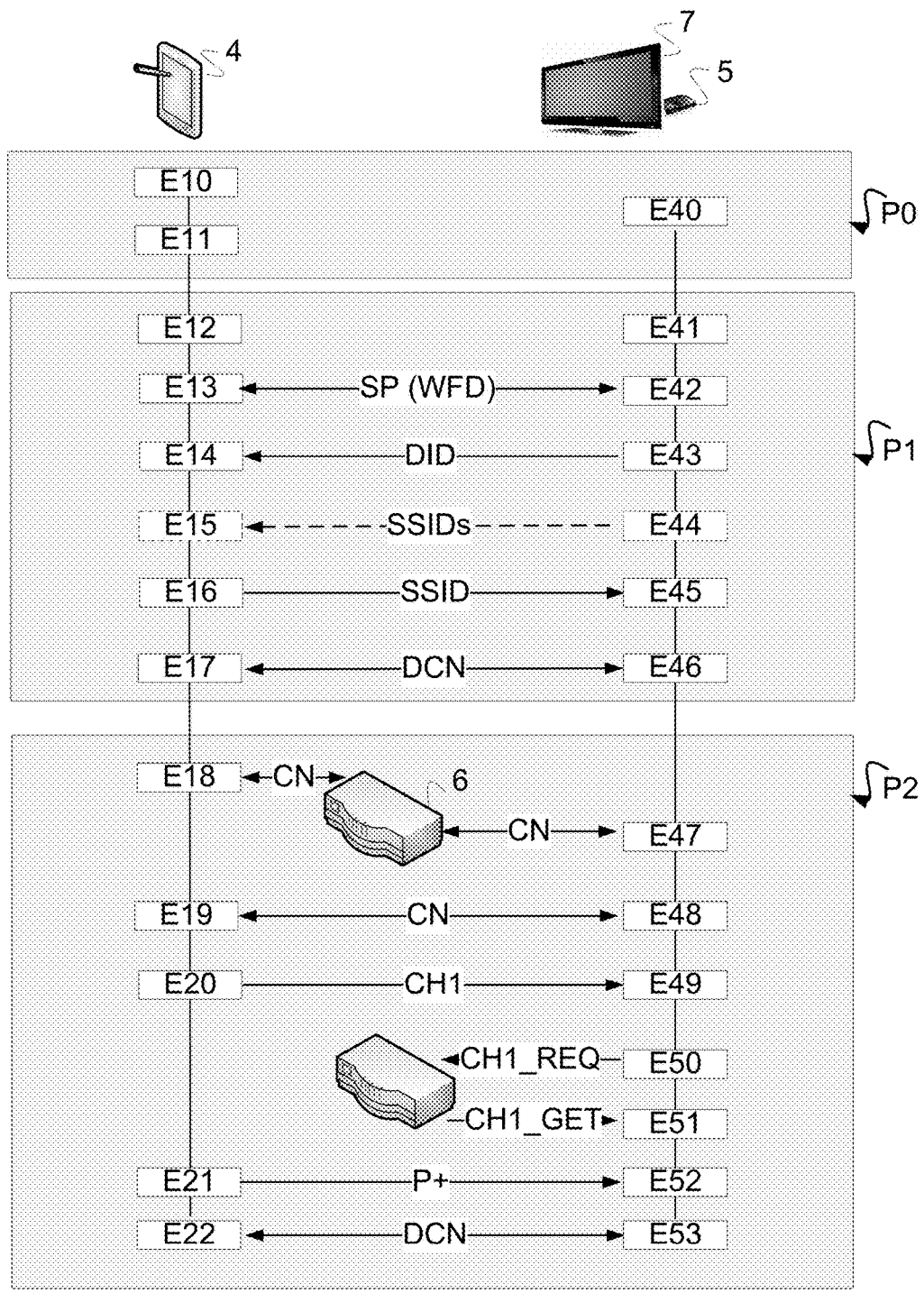
FIG. 6 is a timing diagram showing exchanges between a transfer device and a mobile device in a first implementation of the invention.

FIG. 6 shows a timing chart of exchanges between a transfer device (5) connected to a playback device (TV) and a mobile device (4) in an implementation of the invention. In this implementation, the point-to-point session (SP) of the invention is set up in WiFi direct mode, also known as "WiFi ad hoc" mode. The local network is controlled by a service gateway (6) that is distinct from the mobile device (4). Three successive stages follow on from one another: a first stage (P0) of preliminaries necessary for setting up prerequisites of the invention, followed by a first stage (P1) of point-to-point communication specific to the invention, and then a second stage (P2) of playing back the content.

Preliminaries (P0)

In an initial step E40, a user of the local network (referred to below as "the user") connects the transfer device ("dongle" or electronic key) to the HDMI port of the TV (7). It is assumed that the transfer device already possesses all of the low level and high level software it needs for being powered, for communicating with the network, with the TV, with the mobile device, etc.

It is also assumed that the user has acted during a step E10 to load the mobile telephone (4) with the mobile application including or making use of the transfer control module (CDEP) and the content playback module. By way of example, this may be an electronic program guide (EPG) enabling the various TV channels and/or digital contents (films, music, etc.) to be selected, which guide is stored on the mobile device from an applications server (2) of the services operator. By way of example, this application may be loaded from a mobile application server of Android type on "Google play" or of IOS type on "Apple store" belonging to the supplier Apple, or any other mobile application server.

During a step E11, the user launches the mobile multimedia application (EPG), selects a content, and requests playback of the content to be redirected to the TV (7) via the transfer device (5). This request may be made by any selection means, e.g. a button that appears on the screen of the mobile telephone, a voice command, etc.

Point-to-Point Session Stage (P1)

The purpose of this stage is to set up a bidirectional session in point-to-point mode (SP) between the mobile device (4) and the transfer device (5) in order to transmit in particular the identifiers of the local network to the transfer device and the identifier of the transfer device to the mobile device. This stage is done only once for a given transfer device and a given network: once the transfer device knows the identity of the local network, it can connect itself in infrastructure mode to a gateway (6, 6*bis*) without any need for this point-to-point connection stage. Likewise, once the mobile device knows the identity of the transfer devices available in the local network there is no longer any reason to set up the point-to-point session, unless it seeks to transmit a new gateway identifier.

During a step E41, the transfer device prepares itself for connection. It switches on (or the user switches on) a WiFi type radio channel and it puts itself in WiFi hotspot mode.

In a first variant, this ("ad hoc") point-to-point WiFi mode is put into operation automatically and assumes that the local network is not yet known to the device; specifically, thereafter, if the local network is known to the device, the device seeks to connect thereto automatically in infrastructure mode.

In a second variant, WiFi hotspot mode is put into operation by the user voluntarily putting the electronic key (the transfer device 5) into this mode: this may be done by means of a software or hardware button, a command, etc.

During a step E12 corresponding to preparation, the mobile device opens its WiFi radio communication channel.

The physical point-to-point communication channel (SP) is set up between the two entities during corresponding steps E13 and E42.

During a step E13, the mobile device forces the bidirectional point-to-point session to be set up in WiFi direct mode (SP, WFD) between the two devices, and the transfer device switches over to WiFi direct mode in step E42.

During a step E43, the transfer device sends its identity (DID) to the mobile device. By way of example, this may be a number, a reference, etc., or in more general manner any identification sign that makes it possible subsequently for the mobile device to select this device (e.g. key#2) from a plurality of other devices (key#1, key#2, key#3, etc.) of the same type. It should be observed that this step is optional, particularly if there is only one transfer device connected to only one user playback device.

This identifier is received by the mobile device during a step E14. The mobile device may store this identifier, e.g. in a memory table (M) for subsequent use; optionally, it may store the playback peripheral (TV) to which the transfer device (5) is connected.

During a step E16, the user selects a local network for subsequent connection of the transfer device. It then transmits the identifiers of the selected local network to the transfer device, e.g. the SSID and the password (WEP passcode) of the service gateway (6) of its home network or of the home network of a neighbor, as explained above. The transfer device receives them and possibly stores them during a step E45.

In a variant shown in steps E44 and E15, it is the transfer device itself that transmits to the mobile device a list of network identifiers that it knows already (e.g. a list of SSIDs), either because it has stored them or because it is in hotspot mode, like the prior art device described with reference to FIGS. 1 and 2, enabling such identifiers to be received. In this variant, the list is received by the transfer device in step E15.

In another variant, by way of example, the transfer device may put itself into an association mode during which it can be paired with a home gateway. In a first subvariant, it may be put mechanically into this mode by an external action (physical actuator of the association button type). In another subvariant, it may be put into this mode by a software actuator, by a command coming from the mobile device or from the playback device, etc. Advantageously, in this variant, there is no need to enter a password for connecting to the local network. For example, the WiFi protected setup (WPS) protocol makes it possible in a manner well known to the person skilled in the art for two devices that are close to each other, when put into this mode, to set up communication without inputting a the password of the gateway (WEP passcode, etc.).

In yet another variant, the transfer device automatically connects itself to the mobile network having its gateway in the most immediate proximity.

Once the transfer device is connected, the point-to-point session (SP) can be closed: during a step E17, the mobile device orders closure of the ad hoc point-to-point session. Beforehand, it should be recalled that it has stored at least one identifier of the transfer device. Once the identifiers have been properly exchanged, closure of the session enables both devices to leave point-to-point mode in order to set up another WiFi session in a different mode, in particular with the service gateway in order to connect to the local network.

During a step E46, the transfer device closes the ad hoc point-to-point session. It has then stored at least one identifier of the local network and/or of the service gateway (6, 6*bis*).

Playback Stage (P2)

The purpose of this stage is actually to play back the content that was selected on the mobile device, with playback taking place on the playback device associated with the transfer device. For this purpose, the transfer peripheral (5) must connect with the service gateway (6) in order to have access to the content server.

During a step E18, the mobile device connects to the service gateway in infrastructure mode (IF). This step is optional if the identifier of the content has already been transmitted to the mobile device. Otherwise it is necessary since the point-to-point session has closed and can no longer be used for this purpose.

During a step E47, the transfer device also connects to the service gateway in infrastructure mode (IF), the device having previously stored the identifiers of the gateway.

During a step E19, the transfer control multimedia application (CDEP, e.g. in the form of an EPG) in the mobile device (4) selects the transfer device it seeks to use (e.g. key#2), possibly from a plurality of possible devices, and it connects to the transfer device (key#2) via the home network using the address (DID) of the transfer device as previously stored by the mobile device.

Optionally, during a step E48 of setting up the connection between the transfer device and the mobile device, the transfer device may be requested to authorize connection and it may accept or refuse the request for connection. This connection request may have been made previously via the WiFi direct point-to-point communication channel (WFD).

During a step E20, the user selects a program (CH1), e.g. a television channel, from the mobile application (EPG) and chooses to transfer the audiovisual stream of the program to the transfer device connected to the TV. This selection may be performed by selecting a button on the screen of the mobile device, the button being associated with the channel CH1, by a voice command, by a keyboard key, etc. Selecting this channel (CH1) leads to the mobile device (5) sending an identifier for the selected content, e.g. a number or an address for the video stream that is to be downloaded. In this implementation, in order to limit the complexity of the actions requested of the transfer device, which has as few complex treatment capabilities as possible, a complete address for the content is transmitted in the form of a URL. Since the purpose is to access the content server in the WAN, it is possible to recover content at a data rate that is higher than that initially proposed to the mobile device so as to be able to benefit from higher resolution or higher quality or from an enriched program, or from any other element that might be improved in the quality of the service for the user. The HTTP request (CH1_REC) for the current program "myfilm" on the channel CH1 may be of the following type:

http://myserver.com/mychannelCH1@4Mbits/myfilm:
m4s e.g. for the purpose of indicating that the transfer device is to receive the film "myfilm" from the channel "CH1" of the server "myserver" as a stream at a rate of 4 megabits per second (Mbits/s) by using the supplied http address. By way of example, this example corresponds to an adaptive streaming context in compliance with the MPEG-DASH standard. Specifically, it often happens in the context of the HTTP protocol, that there is need to have recourse to a technique of the adaptive streaming type (known as HTTP adaptive streaming (HAS)) for the purpose of exchanging data between the client terminal and the server. This type of technique makes it possible in particular to provide a good quality of service to the user, e.g. while taking account of variations in bandwidth on the connection between the client terminal and the content server. Various solutions exist for facilitating making such contents available in streaming and distributing it, such as the propriety Microsoft smooth streaming (MSS) and Apple HTTP live streaming (HLS) solutions, or indeed the MPEG DASH (for dynamic adaptive streaming over HTTP-ISO/IEC standard 23009-1:2012 (E)) solution, which is a standard of the ISO/IEC organization that is dedicated to multimedia content streaming on the Internet.

It should be observed that this downloading takes place conventionally via an http URL as described above, but that it could also take place via a universal resource identifier (URI) describing another network and/or another communication protocol (e.g. dvb://mycontentsegmentC1 for television content broadcast via a DVB type broadcast network). Such a method of manipulating universal addresses is well known to the person skilled in the art.

The transfer order is received by the transfer device during a step E49, from the first received address. In a variant, in particular if the transfer device possesses suitable hardware and software means, the received address may be modified prior to accessing the content (e.g. by including additional parameters).

During the following step E50, the transfer device transmits a request to the content server (3) via the previously identified service gateway. This request corresponds to the audiovisual content identified by the mobile device and having an http address that was generated in the manner explained above.

During a following step E51, the transfer device (5) receives the program from the content server (3), via the service gateway (6) as a stream. The media player (MP) of the transfer device (5) then decodes, formats, and plays back the content as it receives it and forwards it via the HDMI port to the playback device with which it is associated (TV). It should be recalled that HDMI is a digital communication standard suitable for transmitting non-compressed audio and video signals at high definition, as standardized by the HDMI forum.

During an optional following step E52, the transfer device receives commands from the mobile device that then acts as a remote control. For example, in this example of FIG. 5, it is requested to change to the following program ("P+").

In this embodiment, the command input by the user via the mobile terminal causes a new complete address to be generated for use by the transfer device. For example, if the user desires to change to the following program, the URL may be in the following form:

http://myserver.com/mychannelCH2@4Mbits/myseries.m4s in order to inform the transfer device that it should change to streaming the content of channel 2 (CH2) that comes after channel 1 (CH1) on the server myserver.

Since a direct session between the mobile device and the transfer device no longer exists in this implementation, the order must pass via the gateway within the local network.

At the end of the streaming session (end of the film, etc.), the application in the transfer device stops and releases the HDMI connection if no more content is expected. The transfer device is ready to receive a new command from the mobile device, or to go back to a point-to-point session mode under the control of another mobile device or the same mobile device (e.g. if it desires to change local networks).

This mechanism may easily be transposed to content of some other type, for example video on demand (VOD). If the content is protected (which may apply to the VOD or to live content), the usual mechanism for managing digital rights (DRM) may be used without thereby going beyond the ambit of the invention.

This mechanism can also be easily transposed to the situation in which the mobile device (4) is acting as an access point to the network in tethering mode. Under such circumstances, the mobile device takes the place of the service gateway (6), but the exchanges remain unchanged.

Figure 7:
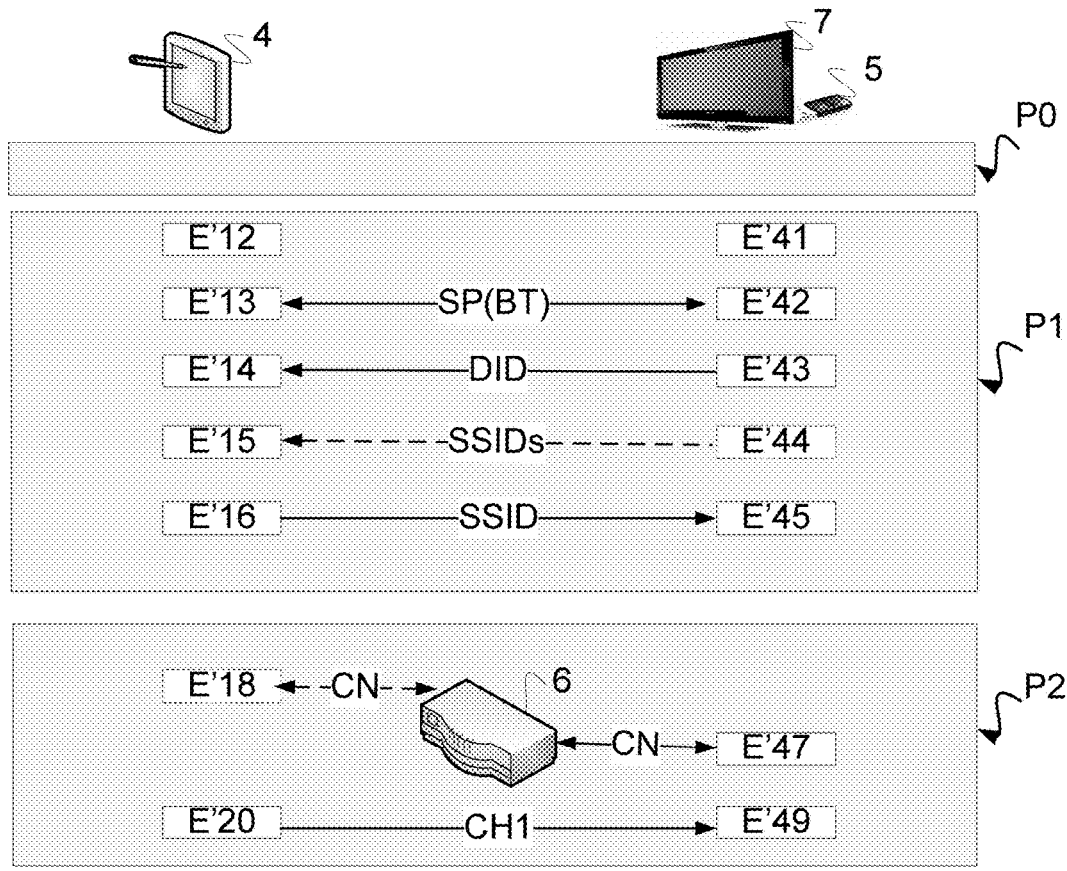
FIG. 7 is a timing diagram showing exchanges between a transfer device and a mobile device in another implementation of the invention.

FIG. 7 is a timing chart of exchanges between a transfer device (5) and a mobile device (4) in a second implementation of the invention. In this implementation, the point-to-point communication channel (SP) of the invention is set up using Bluetooth (BT). The local network is controlled as above by a service gateway (6) that is distinct from the mobile device (4), but it would take place in the same manner in the context of the mobile device acting in tethering mode and performing the functions both of content selection and of routing.

As above, three successive stages take place in sequence: a first stage (P0) of preliminaries needed for performing prerequisites of the invention, followed by a first stage (P1) of private communication over the point-to-point communication channel (SP), and finally a stage (P2) of consuming content. Only the significant differences between these two implementations are described herein.

The preliminary stage P0 is identical to the above-described implementation.

Point-to-Point Session Stage (P1)

As before, the purpose of this stage is to set up a point-to-point session (SP) between the mobile device (4) and the transfer device (5) specifically in order to transmit the identifiers of the gateway of the local network to the transfer device (5) and the identifier of the transfer device to the mobile device (4).

During a step E'41, the transfer device prepares to make the connection. It switches on (or the user switches on) a Bluetooth type radio channel. The main characteristics of this standard that is indeed well known to the person skilled in the art are briefly recalled: it is based on a master/slave mode of operation; in the context of the invention, the master is the mobile device and the slave is the transfer peripheral. The transfer device does no more than open the radio channel. It is then in a so-called "passive" mode, i.e. it is listening to the network.

During a step E'12 corresponding to preparation, the transfer device opens the radio communication channel in Bluetooth mode.

The physical point-to-point communication channel (SP) for the session is set up between the two entities during corresponding steps E'13 and E'42. A connection is set up between the two Bluetooth peripherals by following a procedure that makes it possible to ensure a certain level of security. The connection begins with a search stage known as an "inquiry" stage during which the master peripheral (the mobile device in this example) sends a request to all peripherals present within Bluetooth range. All of the peripherals receiving the request respond with their own addresses. The master peripheral then selects one of them and synchronizes with the selected peripheral. A link is then set up with the selected peripheral enabling the master to begin a service discovery stage using a so-called service discovery protocol (SDP). At the end of this service discovery stage, the master peripheral can create a communication channel with the device it has accessed (referred to as the access point in Bluetooth terminology) by using Bluetooth communication protocol.

It can happen that the access point also incorporates a security mechanism known as pairing that serves to restrict access to authorized users only. Pairing takes place by means of an encryption key (commonly referred to as a personal identification number (PIN)). The access point sends a pairing request to the master peripheral. This may lead to intervention by the user in order to input the PIN code of the access point. If the received PIN code is correct, then association takes place. Once association is effective, the master peripheral can use the communication channel that has been set up in this way.

The Bluetooth standard also defines a certain number of application profiles (Bluetooth profiles) serving to define the types of services that are offered by a Bluetooth peripheral. Each peripheral may support a plurality of profiles. In the context of this implementation, it is advantageous to select the serial port profile (SPP) that enables bidirectional data exchanges to be carried out between the two devices. Naturally, some other Bluetooth profile could be selected as an alternative.

During a step E'43 identical to the step E43 of the preceding figure, the transfer device sends its own identity DID to the mobile device. This identifier is received by the mobile device during a step E'14 identical to the step E14.

The variant shown in steps E'44 and E'15 is identical to that of steps E44 and E15.

During a step E'16 identical to the step E16, the user optionally selects a service gateway from a plurality of possible gateways, for subsequent connection of the transfer device to the corresponding local network. Thereafter it transmits to the transfer device the identifiers of the selected local network, e.g. the SSID and the password (WEP passcode) of the gateway (6, 6bis) as explained above.

The steps of closing the session are not shown since they are optional: with Bluetooth, it is not essential to close the session: the two devices may advantageously remain in Bluetooth connection so as to continue to exchange information over this channel, without that preventing the transfer device (5) from making an infrastructure WiFi mode connection with the service gateway (6) in order to receive the streaming content from the server. Furthermore, disconnection between the two Bluetooth-connected devices may either be explicit (because one of the devices has closed the channel BT) or implicit (in particular if one of the two devices moves out of the maximum range permitted by the standard).

Playback Stage (P2)

The purpose of this stage is actually to play back the content as selected by the mobile device, with playback taking place on the playback device associated with the transfer device.

For this purpose, and as before, the transfer peripheral needs to connect with the service gateway (6, 6bis, 4) in order to be able to access the content sever (3, 3m) in the WAN.

The step E'47 of connecting the transfer device is identical to the step E47.

In contrast, the step E'18 of connecting the mobile device to the service gateway in infrastructure mode is optional in the event of the Bluetooth connection continuing to be set up between the two devices. By way of example, the mobile device may be connected to the mobile network (1) from which it receives the content identifiers (CH1, URL, etc.) for transmitting to the transfer device via the Bluetooth session and for receiving information from the transfer device over the same Bluetooth session.

Likewise, during a step E'20, when the user selects a program (CH1), e.g. a TV channel, by using the application (EPG), and decides to redirect the audiovisual stream of the program to the transfer device connected to the TV (7), this request may take place over the Bluetooth connection if it is still open, unlike above-described step E20.

The other steps (not shown) are identical to those of FIG. 6, with the exception of step E'52: the Bluetooth channel, if it is still open, can also be used for transmitting commands ("Vol+", "Vol−", etc.) from the mobile device (4) to the transfer device and for receiving various kinds of information therefrom (metadata, state of the media player, etc.).

Naturally, the above-described implementations are given merely by way of non-limiting indication and numerous modifications may easily be provided by the person skilled in the art, without thereby going beyond the ambit of the invention.

The invention claimed is:

1. A transfer method for transferring playback of digital content,
    said content being available on a content server accessible via at least one service gateway of at least a local network and being suitable for being processed by at least two user devices,
    a first device referred to as a mobile device and at least one second device referred to as a playback device, the playback device being connected to a transfer device capable of connecting itself to the mobile device through point to point communication or to said local network through the at least one service gateway, said content being selected on the mobile device and being played back on the playback device, the method comprising the following acts performed in the transfer device:
    opening a point-to-point communication channel between the mobile device and the transfer device, wherein only the mobile device and the transfer device have access to said point to point communication channel:
    receiving over the point-to-point communication channel, a gateway identifier for a service gateway of the at least one service gateway, wherein the gateway identifier is specific to the local network accessible by the playback device;
    storing the received gateway identifier in a memory of the transfer device;
    connecting the transfer device to the local network by using the received gateway identifier;

receiving over the point-to-point communication channel, an identifier of the digital content to be played back; and accessing the identified content on the content server via the identified service gateway, accessing the identified content on the content server via the identified service gateway, wherein the identified content is transferred to the playback device.

2. The transfer method according to claim 1, wherein opening a communication channel between the mobile device and the transfer device is followed by an act of transmitting an identifier of the transfer device over the communication channel.

3. The transfer method according to claim 1, wherein the communication channel between the mobile device and the transfer device is set up over a low-power link.

4. The transfer method according to claim 1, wherein opening a point-to-point communication channel between the mobile device and the transfer device is followed by an act of pairing during which a user puts the transfer device into a pairing state.

5. A control method for controlling the-transfer of the playback of digital content,
said content being available on a content server accessible via at least one service gateway of at least a local network and being suitable for being processed by at least two user devices, a first device referred to as a mobile device and at least one second device referred to as a playback device, the playback device being connected to a transfer device capable of connecting itself to the mobile device through point to point communication or to said local network through the at least one service gateway, said content being selected on the mobile device and being played back on the playback device, the method being comprising the following acts performed in the mobile device:
opening a point-to-point communication channel between the mobile device and the transfer device, wherein only the mobile device and the transfer device have access to said point to point communication channel;
receiving an identifier of the transfer device over the point-to-point communication channel;
storing the received identifier of the transfer device in a memory of the mobile device;
sending over the point-to-point communication channel an identifier of a service gateway of the at least one service gateway, wherein the identifier of the service gateway specific to the local network;
selecting one transfer device from a plurality as a function of the received identifier of the transfer device; and
sending over the point-to-point communication channel, an identifier of a content to be played back, wherein the selected transfer device can access the identified content on the content server via the identified service gateway and transfer to the playback device.

6. The control method according to claim 5, wherein the received gateway identifier is the identifier of the mobile device.

7. The control method according to claim 5, further comprising an act of connecting the mobile device to the local network by using a received gateway identifier.

8. A transfer device for transferring digital content available on a content server that is accessible via at least one service gateway of at least a local network and that is suitable for being processed by at least two user devices, a first device referred to as a mobile device and at least one second device referred to as a playback device, the playback device being connected to the transfer device, which is capable of connecting itself to the mobile device through point to point communication or to said local network through the at least one service gateway, said content being selected on the mobile device and being played back on the playback device, the transfer device comprising:
at least one hardware component; a processor; and
a non-transitory computer-readable medium comprising instructions stored thereon, which when executed by the processor configure the transfer device such that the processor and the at least one hardware component together perform the following acts:
opening a point-to-point communication channel between the mobile device and the transfer device, wherein only the mobile device and the transfer device have access to said point to point communication channel;
receiving over the point-to-point communication channel an identifier of a service gateway of the at least one service gateway, wherein the identifier of the service gateway is specific to the local network accessible by the playback device;
storing the received identifier of the service gateway in a memory of the transfer device;
connecting the transfer device to the local network by using the received identifier of the service gateway;
receiving over the point-to-point communication channel, an identifier of a content for playing back; and
accessing the identified content on the content server via the identified service gateway, wherein the identified content is transferred to the playback device.

9. An electronic key including a transfer device according to claim 8.

10. A control device for controlling transfer of digital content available on a content server that is accessible via at least one service gateway of at least a local network and that is suitable for being processed by at least two user devices, a first device referred to as a mobile device and at least one second device referred to as a playback device, the playback device being connected to a transfer device capable of connecting itself to the mobile device through point to point communication or to said local network through the at least one service gateway, said content being selected on the mobile device and being played back on the playback device, the control device comprising:
at least one hardware component;
a processor; and
a non-transitory computer-readable medium comprising instructions stored thereon, which when executed by the processor configure the control device such that the processor and the at least one hardware component together perform the following acts:
opening a point-to-point communication channel between the mobile device and the transfer device, wherein only the mobile device and the transfer device have access to said point to point communication channel;
receiving an identifier of the transfer device over the point-to-point communication channel;
storing the received identifier of the transfer device in a memory of the mobile device;
sending over the communication channel an identifier of a service gateway of the at least one service gateway, wherein the identifier is specific to the local network;
selecting one transfer device from a plurality as a function of the received identifier of the transfer device; and
sending over the point-to-point communication channel, an identification of a content to be played back wherein the selected transfer device can access the identified content on the content server via the identified service gateway and transfer to the playback device.

11. A terminal including a control device according to claim 10 for controlling transfer.

12. A non-transitory computer-readable medium comprising a computer program stored thereon including code instructions for performing a method for transferring the playback of a digital content when the program is executed by a processor of a transfer device, said content being available on a content server accessible via at least one service gateway of at least a local network and being suitable for being processed by at least two user devices, a first device referred to as a mobile device and at least one second device referred to as a playback device, the playback device being connected to the transfer device, which is capable of connecting itself to the mobile device through point to point communication or to said local network through the service gateway, said content being selected on the mobile device and being played back on the playback device, the method comprising the following acts performed in the transfer device:

- opening a point-to-point communication channel between the mobile device and the transfer device, wherein only the mobile device and the transfer device have access to said point to point communication channel;
- receiving over the point-to-point communication channel a gateway identifier for a service gateway of the at least one service gateway, wherein the gateway identifier is specific to the local network accessible by the playback device;
- connecting the transfer device to a-the local network by using the received gateway identifier;
- receiving over the point-to-point communication channel, an identifier of the digital content to be played back; and
- accessing the identified content on the content server via the identified service gateway, wherein the identified content is transferred to the playback device.

13. A non-transitory computer-readable medium comprising a computer program stored thereon including code instructions for performing a method of controlling transfer of playback of digital content when the program is executed by a processor of a mobile device, said content being available on a content server accessible via at least one service gateway of at least a local network and being suitable for being processed by at least two user devices, a first device referred to as the mobile device and at least one second device referred to as a playback device, the playback device being connected to a transfer device capable of connecting itself to the mobile device through point to point communication or to said local network through the at least one service gateway, said content being selected on the mobile device and being played back on the playback device, the method being comprising the following acts performed in the mobile device:

- opening a point-to-point communication channel between the mobile device and the transfer device, wherein only the mobile device and the transfer device have access to said point to point communication channel;
- receiving an identifier of the transfer device over the point-to-point communication channel;
- storing the received identifier of the transfer device in a memory of the mobile device;
- sending over the point-to-point communication channel an identifier of a service gateway of the at least one service gateway, wherein the identifier of the service gateway is specific to the local network;
- selecting one transfer device from a plurality as a function of the received identifier of the transfer device; and
- sending over the point-to-point communication channel, an identifier of a content to be played back, wherein the selected transfer device can access the identified content on the content server via the identified service gateway and transfer to the playback device.

* * * * *